US007488875B2

United States Patent
Bahr et al.

(10) Patent No.: US 7,488,875 B2
(45) Date of Patent: Feb. 10, 2009

(54) PROCESS FOR PURIFYING CARBON NANOTUBES MADE ON REFRACTORY OXIDE SUPPORTS

(75) Inventors: Jeffrey L. Bahr, Houston, TX (US); Yuemei Yang, Houston, TX (US); Kenneth O. McElrath, Houston, TX (US); Martin P. Grosboll, Kingwood, TX (US); Aurelie Mayeux, Houston, TX (US)

(73) Assignee: Unidym, Inc., Menlo Park, CA (US)

( * ) Notice: Subject to any disclaimer, the term of this patent is extended or adjusted under 35 U.S.C. 154(b) by 500 days.

(21) Appl. No.: 11/003,916

(22) Filed: Dec. 3, 2004

(65) Prior Publication Data
US 2006/0062718 A1 Mar. 23, 2006

Related U.S. Application Data (60) Provisional application No. 60/528,018, filed on Dec. 9, 2003.

(51) Int. Cl.
*C01B 31/02* (2006.01)
(52) U.S. Cl. ....................... 977/845; 423/461
(58) Field of Classification Search ................ 423/461; 977/845
See application file for complete search history.

(56) References Cited

U.S. PATENT DOCUMENTS 4,460,764 A * 7/1984 Reffert et al. .............. 528/487
6,120,582 A 9/2000 Vuletic ...................... 95/177
2002/0127171 A1 * 9/2002 Smalley et al. ........... 423/447.6

FOREIGN PATENT DOCUMENTS

| GB | 477744 | 1/1938 |
| JP | 02/190488 | 7/1990 |
| WO | WO00/17102 | 3/2000 |
| WO | WO02/064868 | 8/2002 |
| WO | WO02/064869 | 8/2002 |

OTHER PUBLICATIONS

Hu et al., *Synthetic Metals* 135-136:833-834 (2003).
Mauron et al., *Diamond and Related Materials* 12:780-785 (2003).
Pinheiro et al., *Carbon* 41:2949-2959 (2003).
Sakamoto, "Utilization of Insoluble Residue of Calcined Serpentine Treated with an Aqueous Solution of Carbonic Acid," *Chemical Abstracts* No. 61:16580 (XP-002328680) (2001).
Dai et al., *Chem. Phys. Lett.* 260:471-475 (1996).
Evans et al., *Industrial and Engineering Chemistry* 41(12):2814-2817 (Dec. 1949).

(Continued)

*Primary Examiner*—Wayne Langel
*Assistant Examiner*—Brittany M Martinez
(74) *Attorney, Agent, or Firm*—Williams, Morgan & Amerson, P.C.

(57) ABSTRACT

A carbon nanotube material that comprises carbon nanotubes, a magnesia support and a catalyst metal can be purified by contacting it with a mixture comprising carbon dioxide and water. At least some of the magnesia support is reacted to form water-soluble compounds.

20 Claims, 1 Drawing Sheet

OTHER PUBLICATIONS

Horiguchi et al., *Journal of the Scientific Research Institute* 45:193-198 (Dec. 1951).

Swaddle, *Inorganic Chemistry*, pp. 205-207, 264-271 and 348-351 (1990).

Latimer et al., *Inorganic Chemistry*, pp. 274-277 and 388-393 (1940).

Durrant et al., *Introduction to Advanced Inorganic Chemistry*, pp. 440-444, 840-841 and 1030 (1962).

Parkes, *Mellor's Modern Inorganic Chemistry*, pp. 392-395, 514-515, 630-633 and 690-693 (1961).

Heslop et al., *Inorganic Chemistry*, Chapter 15, pp. 250-259 (1960).

Lackner et al., "Carbon Dioxide Disposal in Solid Form," *Proceedings of the 21st International Conference on Coal Utilization and Fuel Systems*, Clearwater, Florida (Mar. 18-21, 1996).

Cotton et al., "Boiler Systems—Chemical Treatment," *Analyst Spring 2003—Boiler Systems—Chemical Treatment*, http://www.awt.org/members/publications/analyst/2003/spring/Boiler_Systems_chemical (printed Sep. 19, 2003).

O'Connor et al., "$CO_2$ Storage in Solid Form: A Study of Direct Mineral Carbonation," *Fifth International Conference on Greenhouse Gas Control Technologies*, Cairns, Australia (Aug. 13-16, 2000).

Vance, "Iron—The Environmental Impact of a Universal Element," *2 The 4 Technology Solutions*, pp. 1-4, http://www.2the4.net/iron.htm (printed Sep. 19, 2003).

Smithson et al., *Ind. Eng. Chem. Process Des. Develop.* 12(1):99-106 (1973).

* cited by examiner

PROCESS FOR PURIFYING CARBON NANOTUBES MADE ON REFRACTORY OXIDE SUPPORTS

CROSS-REFERENCE TO RELATED APPLICATION

This application claims priority from provisional United Patent application, Ser. No. 60/528,018, filed Dec. 9, 2003, which application is incorporated herein by reference.

FIELD OF THE INVENTION

This invention relates generally to a method for purifying carbon nanotubes, particularly carbon nanotubes made with metal catalysts on refractory oxide supports.

BACKGROUND OF THE INVENTION

Small-diameter carbon nanotubes having diameters between about 0.5 and about 3 nanometers, and lengths usually greater than about 50 nm, commonly known as "buckytubes," have been the subject of intense research since their discovery due to their unique properties, including high strength, stiffness, thermal and electrical conductivity. The walls of small-diameter carbon nanotubes are fullerenes consisting essentially of $sp^2$-hybridized carbon atoms typically arranged in hexagons and pentagons. Some small-diameter carbon nanotubes have only one wall, and others have more than one. Large-diameter multi-wall carbon nanotubes (MWNT), having diameters in excess of about 4 nanometers, are multiple nested carbon cylinders. Because large-diameter multi-wall carbon nanotubes have substantially greater density of defects in their side-walls, they are, consequently, mechanically less strong and electrically less conductive than small-diameter carbon nanotubes. Additionally, compared to the large-diameter multi-wall carbon nanotubes, small-diameter carbon nanotubes have considerably higher available surface area per gram of carbon.

Most methods for carbon nanotube production involve one or a combination of transition metal catalysts in contact with a carbon-containing feedstock at an elevated temperature, typically between about 700° C. and 1200° C. Some of the methods to make carbon nanotubes include electric arc, laser ablation of graphite, and gas phase techniques with supported and unsupported metal catalysts.

One method of preparing carbon nanotubes on supported metal catalyst is known as "chemical vapor deposition" or "CVD". In this method, gaseous carbon-containing feedstock molecules react on nanometer-scale particles of catalytic metal supported on a substrate to form carbon nanotubes. This procedure has been used to produce large-diameter multi-wall carbon nanotubes, however, under certain reaction conditions, CVD methods can produce excellent single-wall and small-diameter multi-wall carbon nanotubes. Synthesis of small-diameter carbon nanotubes using CVD methodology has been described in Dai, et al. (1996), *Chem. Phys. Lett.*, 260, p. 471-475, and "Catalytic Growth of Single-Wall Carbon Nanotubes from Metal Particles," International Pat. Publ. WO 00/17102 A1, published Mar. 30, 2000, each incorporated herein by reference. The carbon nanotube material that results from a CVD process can comprise single-wall and/or multi-wall carbon nanotubes, residual catalyst metal particles, catalyst support material, and other extraneous carbon forms, which can be amorphous carbon, and non-tubular fullerenes. The term "extraneous carbon" will be used herein as any carbon that is not in the form of carbon nanotubes, and can include graphene sheets, graphite, non-tubular fullerenes, partial nanotube forms, amorphous carbon and other disordered carbon.

For many carbon nanotube applications, purified nanotube material is often desired. In the purification of a nanotube product made using a metallic catalyst on a support material such as a refractory oxide, removal of the support material, as well as the metallic catalyst residues and extraneous carbon, is desired.

Procedures for purification of carbon nanotubes are related in International Patent Publications "Process for Purifying Single-Wall Carbon Nanotubes and Compositions Thereof," WO 02/064,869 published Aug. 22, 2002, and "Gas Phase Process for Purifying Single-Wall Carbon Nanotubes and Compositions Thereof," WO 02/064,868 published Aug. 22, 2002, and incorporated herein in their entirety by reference. In addition to heating in an oxidative environment, both of these methods involve treatments to remove residual metal. In WO 02/064,869, metal is removed by an acid treatment in the liquid state, using such acids as hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. In WO 02/064,868, metal is reacted with halogen-containing gases, such as chlorine, bromine, fluorine, and iodine, as well as their gaseous acids (HCl, HBr, HF, and HI) to form volatile metal compounds are removable by purging.

Many processing methods and articles of manufacture involving carbon nanotubes are enhanced by using a purified carbon nanotube material in which the presence of the catalytic metal and the catalyst support material is minimized. Purification procedures for removing the catalyst support and the catalytic metal that use strong acids, especially mineral acids, such as sulfuric acid and nitric acid, can damage to the nanotubes and cause loss of nanotube product. The ends of the nanotubes may be opened and existing defects in sidewalls enlarged. A purification method that minimizes such product damage and loss is desired. Additionally, implementing treatments with halogens and halogen acids, such as HF and HCl, poses greater expense, as well as scale-up difficulties, due to the chemical corrosivity that require special vessels, such as glass-lined vessels or vessels made of special metal alloys (e.g. Hastaloy C), additional process steps, and expensive chemical disposal. A method for purifying carbon nanotubes, and in particular carbon nanotubes made on a refractory oxide support, is sought, wherein the method is efficient, cost-effective and scalable.

SUMMARY OF THE INVENTION

The present invention relates to a method for purifying carbon nanotubes, particularly carbon nanotubes made using a metal catalyst on a refractory oxide support material. The method is scalable and suitable for purification of carbon nanotubes having a single wall or more than one wall.

In one embodiment, a method for purifying carbon nanotube material comprises contacting a carbon nanotube material comprising carbon nanotubes, a magnesia support and a catalyst metal, with a mixture comprising carbon dioxide and water, wherein at least some of the magnesia support is reacted to form water-soluble compounds. The soluble compounds can then be separated from the carbon nanotube material. In another embodiment, at least some of the catalyst metal also reacts with the mixture comprising carbon dioxide and water. The mixture comprising carbon dioxide and water can be in the range of about 0° C. and 100° C. Typically, the mixture comprising carbon dioxide and water is at a temperature in the range between about 0° C. and about 40° C., more typically, in the range between about 0° C. and about 30° C., more typically in the range between about 0° C. and about 20° C.

In another embodiment, a method for purifying carbon nanotube material comprises contacting a carbon nanotube material comprising carbon nanotubes, a magnesia support and a catalyst metal, with a mixture comprising carbon dioxide and water, wherein at least some of the magnesia support reacts to form water-soluble compounds. In other embodiments, the method can further comprise separating the soluble compounds from the carbon nanotube material, and treating the nanotube material with an acid selected from the group consisting of hydrochloric, nitric, sulfuric and combinations thereof. In another embodiment, at least some of the catalyst metal is reacted in the mixture comprising carbon dioxide and water. Generally, the aqueous mixture comprising carbon dioxide and water is in a range of about 0° C. and about 100° C. Typically, the temperature of the aqueous mixture in the range between about 0° C. and about 40° C., more typically in the range between about 0° C. and about 30° C., more typically in the range between about 0° C. and about 20° C.

DESCRIPTION OF ILLUSTRATIVE EMBODIMENTS

In supported catalyst processes, carbon nanotubes are made by the catalytic decomposition of a carbon-bearing feedstock by a transition-metal catalyst supported on a support material, such as a refractory oxide. The carbon nanotube product resulting from this process comprises carbon nanotubes, catalytic metal, refractory oxide support material and various amounts of extraneous carbon. Refractory oxide support materials that have commonly been used for supported catalyst growth of carbon nanotubes include, but are not limited to, the oxides of silicon, aluminum and magnesium. The refractory oxide support materials generally have extremely low solubility in water and other solvents, but can react with certain acids. The residual catalytic metal is generally in the form of nanometer-scale particles comprising the catalytic metal, which may be partially or entirely covered with amorphous and/or graphitic carbon. The metal particles may comprise metals, metal oxides, metal carbides, or a combination thereof.

The present invention involves a scalable, efficient and cost-effective method for purification of carbon nanotube material made using catalytic metal on a refractory oxide support. The present purification method is a relatively gentle method, in that it generally does not damage or modify the nanotubes, and thereby provides a superior product for applications requiring substantially defect-free nanotubes.

This invention method comprises contacting a carbon nanotube material comprising carbon nanotubes, a catalyst support and catalyst metal with a mixture comprising carbon dioxide and water, wherein at least some of the catalyst support reacts in the mixture to form water-soluble species that can be removed from the solid, water-insoluble nanotubes. In another embodiment, at least some of the catalyst metal reacts in the mixture to form water-soluble, metal-containing species that are separable from the insoluble carbon nanotube material.

The mixture comprising carbon dioxide and water generally comprises primarily water. The mixture can also be referred to as "carbonated water" herein and can comprise gaseous carbon dioxide, aqueous carbon dioxide (i.e. carbon dioxide dissolved in water), water and carbonic acid ($H_2CO_3$). Carbonic acid is a weak acid. According to "Reference Book of Inorganic Chemistry" by W. M. Latimer and J. H. Hildebrand, The Macmillan Company, 1940, page 274, "[a]t 1 atmosphere of $CO_2$ and 25° C., a water solution contains 0.0338 M $H_2CO_3$. The [carbonic] acid is weak, the dissociation constants being, respectively, $K_1=4.3\times10^{-7}$ and $K_2=4.7\times10^{-11}$. A saturated solution (1 atm.) thus contains $10^{-4}$ M $H^+$."

Carbon dioxide can be used from a gas cylinder or generated from carbonate-containing compounds, such as sodium bicarbonate and sodium carbonate, by heating or reacting with acids. Some of the catalytic metals present in the carbon nanotube product can also react with the carbonic acid to form water-soluble compounds.

In another embodiment, other chemical agents can be added to the mixture to promote the solubility of the soluble species. Examples of such chemical agents, include, but are not limited to, reducing agents, complexing agents, surfactants or other solvents. Chelating agents can also be used to chelate or sequester metal ions in solution.

In one embodiment, the process of purifying carbon nanotube material comprises reacting the catalyst support material with an aqueous mixture comprising carbon dioxide and water to form water-soluble species. The resulting water-soluble species can be separated from the remaining insoluble carbon nanotube material using such means as filtration, centrifugation, decanting, or other means for solid-liquid separation.

The chemical treatment of the carbon nanotube material to convert the catalyst support material, the catalyst metal or both to water-soluble species can be applied multiple times. For example, as-produced carbon nanotube material made using a metal-loaded catalyst support may be subjected to repeated chemical treatments to form water-soluble species, filtered, and rinsed multiple times, as desired, to obtain the desired carbon nanotube purity. Successive chemical treatments generally result in a progressively purer product. Also, the particular conditions of any subsequent chemical treatments can be modified such that the earlier treatments remove particular impurities, such as the catalyst support material. Later treatments, if desired, can be done to primarily remove other impurities, such as the catalyst metal residues. These latter treatments can include the addition of reducing agents, complexing agents, chelating agents, surfactants, amines or combinations thereof, to enhance metal removal. These added ingredients can be used with or without added $CO_2$ in the aqueous phase.

The mixture comprising carbon dioxide and water can also comprise water-soluble amines, such as ethylene diamine. In this embodiment, water-soluble carbamates may be formed.

In another embodiment, the present process for purifying carbon nanotubes can remove at least some of the catalyst support, residual catalytic metal, or both, from the carbon nanotube material. The catalytic metal may be separated from the carbon nanotube material by physical means, chemical means, or both. Without being limited by theory, the metallic catalyst residue may be mechanically freed from the catalyst support as the support reacts into suspendable or soluble species in a liquid medium. The freed metallic particles may be dispersed in the liquid medium and removed from the carbon nanotube material by such means as filtering. In a chemical means of separation, the metal species can be reacted into soluble compounds, preferably water-soluble compounds, and separated from the nanotubes by filtration or other liquid-solid separation means.

The mixture comprising carbon dioxide and water can also comprise surfactants, which can promote the dispersion and/or solubilization of the metal species. The mixture can also comprise chelating agents, such as ethylenediaminetetraacetic acid (EDTA), which can be used to chelate or sequester ionic metal species. Such surfactants or chelating agents are useful in maintaining a dispersion of the metal, and facilitating metal removal from the carbon nanotube material being purified. Other bi-dentate or multi-dentate ligands, such as oxalate and malonate, can also be used. Ligands forming mononuclear complexes can also be used.

Another embodiment of the present invention involves a method for purifying carbon nanotubes formed in a supported-catalyst process wherein the catalyst support is magnesium oxide. In this embodiment, at least some of the magnesium oxide and at least some of the catalytic metal can be removed from the carbon nanotube material being purified.

Without being limited by theory, when magnesium oxide (MgO) is contacted with water, MgO oxide reacts with water to form magnesium hydroxide, $Mg(OH)_2$. When either MgO or $Mg(OH)_2$ is contacted with a mixture comprising carbon dioxide and water, magnesium bicarbonate ($Mg(HCO_3)_2$), which is very water-soluble, is formed. Although, not to be held by theory, the reaction of MgO to the bicarbonate is expected to proceed more slowly than the hydroxide, in part because the oxide is thought to go through the hydroxide state before reacting to the bicarbonate. The overall reactions may be written as follows:

$$MgO + H_2O + 2CO_2 \rightarrow Mg(HCO_3)_2$$

$$Mg(OH)_2 + 2CO_2 \rightarrow Mg(HCO_3)_2$$

In the temperature range between about 10° C. and about 20° C., magnesium bicarbonate can be converted to magnesium carbonate ($MgCO_3$), or a hydrated form, such as $MgCO_3 \cdot 3H_2O$ or $MgCO_3 \cdot 5H_2O$. Depending on the temperature and concentrations, $Mg(HCO_3)_2$ can decompose and precipitate as magnesium carbonate or the tri- or penta-hydrate. According to Smithson and Bakhshi in "Kinetics and Mechanism of Carbonation of Magnesium Oxide Slurries," *Ind. Eng. Chem. Process Des. Develop.*, Vol. 12, No. 1, 1973, pp. 99-106, the following reactions occur, depending on the prevailing temperature.

$$At > 14° C., Mg(HCO_3)_2 + 2H_2O \rightarrow MgCO_3 \cdot 3H_2O + 2CO_2$$

$$At < 14° C., Mg(HCO_3)_2 + 4H_2O \rightarrow MgCO_3 \cdot 5H_2O + 2CO_2$$

Although not as soluble as the bicarbonate, magnesium carbonate has some water solubility between about 10° C. and about 20° C. The hydrated forms of magnesium carbonate are more soluble than the non-hydrated form, but all can readily precipitate in aqueous systems after exceeding their solubility limit. Although $MgCO_3$ can also react with carbonic acid to form magnesium bicarbonate, the reaction is generally slow.

$$MgCO_3 + H_2CO_3 \rightarrow Mg(HCO_3)_2$$

The conversion of the magnesium bicarbonate to magnesium carbonate is relatively slow, and the magnesium bicarbonate is sufficiently soluble to stay dissolved in the water for an hour or more at temperatures between about 10° C. and about 20° C. Increasing the temperature will accelerate the rate of precipitation of the magnesium carbonate. (See St. Clair and Evans, *Ind. and Eng. Chem.* 41, p. 2814 (1949).)

The solubility of magnesium bicarbonate is highly dependent on the partial pressure of carbon dioxide. With a high carbon dioxide partial pressure, magnesium bicarbonate solution can be supersaturated, though meta-stable. High carbon dioxide pressure will force the equilibrium to favor the more soluble bicarbonate over the less soluble carbonate.

In one embodiment, the present invention involves a method for purifying carbon nanotube material comprising magnesium oxide used as the support, carbon nanotubes, amorphous carbon, and catalytic metal used in the carbon nanotube growth process. The as-produced carbon nanotube material is contacted with a mixture of carbon dioxide and water by bubbling carbon dioxide through water containing the carbon nanotube material for a reaction period between about 0.5 minute and about 300 minutes at a temperature between about 0° C. and about 100° C. At least a portion of the magnesium oxide catalyst support reacts and dissolves in the carbonated water. The temperature is typically kept low, such as, for example, between about 0° C. and about 40° C., more typically between about 0° C. and about 30° C., and more typically between about 0° C. and about 20° C. The lower temperatures will increase the amount of dissolved carbon dioxide and promote solubility of the soluble bicarbonate species. Shorter reaction periods are also possible, such as between about 0.5 minute and about 100 minutes, typically between about 0.5 minute and about 50 minutes, more typically between about 0.5 and about 25 minutes, and more typically between about 0.5 minute and about 10 minutes.

The insoluble material comprising the carbon nanotubes is separated from the soluble species, which can comprise soluble magnesium bicarbonate, before substantial precipitation of magnesium carbonate occurs, which generally happens slowly at low temperatures, such as between about 0° C. and about 20° C. The separation of the insoluble nanotube material can be done by filtration, centrifugation or other known means of solid-liquid separation.

The reaction of MgO to $Mg(HCO_3)_2$ is promoted by increasing $CO_2$ dissolved in the mixture comprising $CO_2$ and water. Higher $CO_2$ concentrations are obtainable, by such means as by (a) keeping the bath temperature low to maximize $CO_2$ solubility, (b) keeping the water saturated with $CO_2$ by continuously feeding $CO_2$ to the bath, and (c) increasing the pressure on the reaction by conducting the reaction at superatmospheric pressure (i.e., greater than 1 atmosphere).

Since the formation of magnesium bicarbonate is exothermic and the formation of magnesium carbonate ($MgCO_3$) is promoted by heat, the reaction temperature is preferably kept low and the reaction time is preferably kept short to minimize $MgCO_3$ formation and precipitation. However, since all reaction rates and diffusion of reacting species are increased at elevated temperatures, there will be an optimum temperature and time of reaction in which the reaction selectivity is optimized for a particular type of process equipment.

Removing large amounts of MgO from the carbon nanotube material without exceeding the solubility limit of magnesium bicarbonate in the carbon dioxide/water mixture may require repeating the $CO_2$-water treatments several times in batch-type processes. The catalytic metals used in carbon nanotube growth, typically chosen from Group VIB and/or Group VIIIB transition metals, can also be removed to some extent by treatment with the carbonated water. Treating such metals with the carbonated water mixture can form soluble metal compounds that can be separated from the insoluble carbon nanotube material by solid-liquid separation means, examples of which have been previously cited.

In one embodiment, the purification can comprise first heating the carbon nanotube material in an oxidative environment generally in the range of about 100° C. and about 400° C., and more generally, in the range of about 200° C. and about 300° C. The oxidative environment can comprise an oxidative gas, such as, for example, air or moist air. Heating in an oxidative environment can oxidize metallic iron to iron oxide, such as $Fe_2O_3$, and also burn some of the extraneous or amorphous carbon. After the oxidative treatment, the oxidized nanotube product can be contacted with the mixture comprising carbon dioxide and water, wherein at least some of the magnesia, iron and/or iron oxide species react to produce water-soluble iron compounds that are easily removed from the resulting insoluble carbon nanotube material.

In another embodiment, the carbon nanotube material is purified with one or more repetitions of treatment with the mixture comprising $CO_2$ and water. A liquid-solid separation can be done between treatments. In another embodiment, different treatments can be done to remove more of the catalytic metal residues by mixing the carbon nanotube material with stronger acids, such as, nitric, sulfuric, and/or hydrochloric acid. Short treatment times and low acid concentrations are used to minimize producing defects in the nanotubes, cutting the carbon nanotubes, or otherwise modifying the structure of the nanotubes. Preferably, the acid concentration is less than 2 Molar.

In another embodiment, the carbon nanotube material is purified using a continuous flow treatment with a mixture comprising $CO_2$ and water. The water and carbon dioxide can be continuously added while the nanotube material is retained in the reactor by a frit or filter. The aqueous mixture effluent is continuously removed from the reaction unit such that the incoming volume approximately matches the outflowing volume to maintain a steady-state reaction volume. Additionally, further treatment to remove more catalytic metal residues can be done by mixing the carbon nanotube material with stronger acids, such as, but not limited to, nitric, sulfuric, and/or hydrochloric acid. Short treatment times and low acid concentrations are used to minimize producing defects in the nanotubes, cutting the carbon nanotubes, or otherwise modifying the structure of the nanotubes. Preferably, the acid concentration is less than 2 Molar.

In another embodiment, a chelating agent is added to the carbonated water mixture. An example of a suitable chelating agent is EDTA (ethylene diamine tetraacetic acid). Transition metal ions produced during the carbonated water treatment with as-produced carbon nanotube material can be chelated to sequester the metal ions and facilitate their removal from the solid nanotube material.

In another embodiment, complexing agents can be used to complex the catalytic metal ions and minimize precipitation of metal compounds. The particular complexes formed are dependent upon the specific metal compound and the oxidation state of the metal. For example, the ferric ion forms complexes with the oxalate ion $(CH_3COO)^{-1}$.

The purification method of the present invention can be done in an apparatus comprising a temperature-controlled vessel to mix the carbon nanotube material with the carbon dioxide/water mixture and a means for introducing and regulating carbon dioxide into the vessel. Temperature control can be done by various means, including, but not limited to, immersion of the vessel in a temperature-controlled bath and/or insertion of a temperature-control element, such as a cooling coil, into the vessel. The bath temperature is preferably maintained between about 0° C. to about 100° C., typically between about 0° C. to about 20° C., in order to maximize carbon dioxide solubility in the liquid and minimize the rate of magnesium carbonate precipitation.

During the contacting of the carbon nanotube material with the mixture comprising $CO_2$ and water, the pH generally decreases and the temperature of the mixture can increase. Since the $CO_2$ solubility in water decreases with increasing temperature, higher reactor pressure can be applied to increase the $CO_2$ partial pressure and thus maximize the soluble bicarbonate solubility and reduce carbonate formation and precipitation.

In another embodiment, the carbon nanotube material can be mixed in-line with carbonated water as a preconditioning step, and then introduced into a reaction vessel for further treatment. Furthermore, carbon nanotube material can be withdrawn from the reaction vessel and pumped through a mixing zone where additional $CO_2$ can be injected. Passing the carbon nanotube material through a mixing zone can increase mass transfer and reduce the residence time needed in the reaction vessel. The mixing zone can include a high intensity mixer, a static mixer or a combination thereof. Added $CO_2$ can replenish $CO_2$ reacted away in the mixing zone. After exiting the mixing zone, the nanotube mixture can be returned to the top of the reaction vessel. Besides during preconditioning, mixing and reacting, carbonated water can also be used to wash the purified product during filtering. Use of carbonated water during filtering minimizes the formation of magnesium carbonate precipitates.

In another embodiment, the purification process is a semi-continuous process wherein carbonated water is passed continuously through carbon nanotube material held in a fixed bed arrangement, such as by filter, frit, screen or other suitable means. The carbonated water reacts with at least some of the refractory oxide support material and catalytic metal to form water-soluble compounds and carries the soluble species away as it flows through the carbon nanotube material. After the process is continued until the desired level of purification is achieved, the purified carbon nanotube material is recovered. Alternately, in a totally continuous process arrangement, the impure carbon nanotube material may be introduced to the reactor in a flow counter-current to the flow of the carbon dioxide/water mixture.

The purified carbon nanotube material of this invention is useful in products and articles of manufacture that incorporate carbon nanotubes, and it enables new and improved articles of manufacture, including, but not limited to, composite materials with electrical, mechanical, electromagnetic or chemical properties derived in part from single-wall and small-diameter multi-wall carbon nanotubes contained therein; electrodes of fuel cells, capacitors or batteries, particularly lithium-ion batteries; catalyst supports, structure-modifying additives for vehicle tires and laminated composites, including high-strength carbon fiber composites, anti-corrosion and other electrochemical materials and coatings; fibers containing or comprised entirely of single-wall and small-diameter multi-wall carbon nanotubes; chemical, physical, and electronic sensors; films and coatings; inks and conducting materials that may be printed in any way; electrically and thermally conductive coatings, electrically and thermally conductive composite materials, electromagnetic and radio-frequency shielding materials; field emission cathodes; biologically-compatible coatings, objects and devices that are inserted or implanted into living organisms; radar-absorbing materials, optically-active materials and devices; components of systems that convert sunlight to electrical energy; electronic devices including transistors, pass elements, capacitors, inductors, resistors, connectors, switches, wires, interconnections devices and antennae at frequencies up to and including optical frequencies; electronic circuit fabrication materials; electrical and thermal conducting materials, transducers, electrical transmission cable, high-strength fiber, and structural elements of machines, buildings, and vehicles.

The fundamental improvements enabled by purified carbon nanotubes in the cited applications are derived primarily from the reduced level of defects in the nanotubes and the associated enhanced properties of these purified carbon nanotubes to interact with other carbon nanotubes, with other materials in composite applications, with other chemicals, and with liquid agents that dissolve or suspend carbon nanotubes. This greater degree of structural perfection and enhanced interaction, in turn, permits use of smaller amounts of carbon nanotubes in some applications, and improves the desired electrical, chemical, and/or mechanical properties of the materials, devices and/or other entities comprising carbon nanotubes in these and other applications.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example describes removal of magnesium oxide catalyst support from as-produced carbon nanotubes made with a supported catalyst comprising magnesium oxide, iron and molybdenum produced by a combustion procedure.

The catalyst was prepared by mixing together 1010.1 g magnesium nitrate hexahydrate ($Mg(NO_3)_2 \cdot 6H_2O$), 1 liter deionized water, 55.56 g iron nitrate nonahydrate ($Fe(NO_3)_3 \cdot 9H_2O$), 1.413 g ammonium heptamolybdate tetrahydrate (($NH_4)_6Mo_7O_{24} \cdot 4H_2O$), and 303.0 g anhydrous citric acid, and stirring until a clear solution was formed. The solution was put in a 4-liter quartz beaker and placed in a high temperature furnace at 550° C. for 2 hrs. The solution foamed and a large quantity of light yellow fluffy solid filled the beaker. After the 2 hours at temperature, the solid was cooled. After cooling, the resulting solid was ground into a powder, calcined at 550° C. for 12 hrs and then cooled. The resulting catalyst contained 4.8 wt % Fe and 0.48 wt % Mo with respect to the weight of MgO.

This catalyst was used to produce carbon nanotubes. 45 g catalyst was loaded in a 2.5 inch-diameter fluidized-bed quartz reactor fitted with a quartz frit in the middle to position the catalyst in the middle of the tube reactor. The reactor was mounted vertically in a high temperature tubular furnace and gases were introduced from the bottom of the reactor. The reactor was first purged with argon gas (flow rate: 2000 sccm) and the temperature increased at a rate of 60° C./min to 900° C. At 900° C., methane ($CH_4$, flow rate: 6000 sccm) was turned on for 10 min and then turned off. The reactor was cooled to room temperature under an argon purge. The resulting material retrieved from the reactor was dark black powder. TGA ramped to 800° C. in air indicated that the as-produced carbon nanotube material consisted of about 20 wt % carbon with respect to the catalyst weight.

The as-produced carbon nanotube material was then purified. 500 mls deionized water was added to a 1-liter round bottom flask which was equipped with an inlet tube which extended into the water and which was fitted with a coarse frit to disperse the $CO_2$ gas. The flask was also equipped with an overhead mixer, an internal thermometer, and rubber septa with a vent needle. 5.0 g as-produced carbon nanotube material was added to the water in the flask and stirred vigorously with a paddle-type mixer using an overhead motor assembly to rotate the stirring paddle. The liquid mixture was cooled to 15° C. by immersing the flask in an ice water bath. Carbon dioxide gas was bubbled through the suspension at a rate of approximately 4 standard liters per minute for 3.5 hours. During the course of the reaction, the temperature of the liquid in the flask rose to approximately 4° C. to 19° C., and was maintained at or below 19° C. for the duration of the 3.5 hour treatment, after which time the suspension was filtered using Whatman #2 filter paper. The resulting insoluble carbon nanotube material was washed on the filter paper with approximately 1 liter deionized water.

The resulting carbon nanotube material comprised nanotubes, catalytic metal, and a small amount of residual MgO. Thermogravimetric analysis (TGA) of the purified carbon nanotube material was conducted in air up to a temperature of 1000° C. The TGA treatment oxidized all carbon in the sample and left an ash residue of 15.7 wt %.

Based on TGA measurements on a small fraction of the as-produced sample prior to the purification procedure, approximately 16%, or 0.8 g of the original 5 g sample of as-produced carbon nanotube material, was carbon, and approximately 4%, or 0.2 g of the original 5 g sample of as-produced carbon nanotube material, was catalytic metal.

EXAMPLE 2

This example demonstrates multiple applications of the purification process described in Example 1. The residual amounts of support material and metal catalyst generally decreased with successive applications of the purification process.

500 mls deionized water was added to a 1-liter round bottom flask equipped with a gas inlet tube that extended into the water and was fitted with a coarse frit to disperse the $CO_2$ gas. The flask also was equipped with an overhead mixer, internal thermometer, and rubber septa with a vent needle. 5.0 g as-produced carbon nanotube material, made in Example 1, was added to the water in the flask. The liquid was cooled to 16° C. by immersing the flask in an ice water bath and vigorously stirred (1000 rpm) with a paddle-type mixer while $CO_2$ was bubbled through the mixture at a rate of 4.1 standard liters per minute for 30 minutes. After 30 minutes, the suspension was filtered using #2 Whatman filter paper. The solids were then ground using a mortar and pestle. A small sample was retained, and the balance of the solid material was returned to the flask, which had been refilled with 500 mls deionized water. The stirring and $CO_2$ bubbling procedure was repeated for another 30 minutes; the solids were separated, and a sample retained. This process was repeated 6 times. The residuals, as indicated by TGA analysis of each of the retained samples, were as follows: 23.17 wt %, 9.37 wt %, 6.93 wt %, 6.42 wt %, 6.49 wt %, 6.46 wt %, and 5.89 wt %.

EXAMPLE 3

This example demonstrates repetitive purifications with elemental analysis of the residues. Four separate experiments of the type described in Example 2 were performed. The four experiments were carried out, using one, two, three and four iterations of the $CO_2$/water treatment and filtering process that was iterated seven times in Example 2. The final product of each of these experiments was heated in air at 800° C. for one hour to remove all carbon. The residuals were then subjected to elemental analysis by mass spectroscopy. Elemental analysis indicated that, after one iteration of $CO_2$/water treatment and filtering, approximately 85% of the residual material was magnesium oxide, and the remainder catalytic metal. With successive iterations of $CO_2$/water treatment and filtering, more magnesium oxide was removed, and with four iterations, the residue contained roughly equal amounts of magnesium oxide and catalytic metal. As per Example 2, the total residuals were generally less after each iteration. Since the catalyst composition was originally 95% magnesium oxide and 5% catalytic metal, the process removes most of the magnesium oxide and some catalytic metal.

EXAMPLE 4

This example demonstrates the purification of carbon nanotubes using a mixture of carbon dioxide and water in a continuous flow system.

Figure 1:
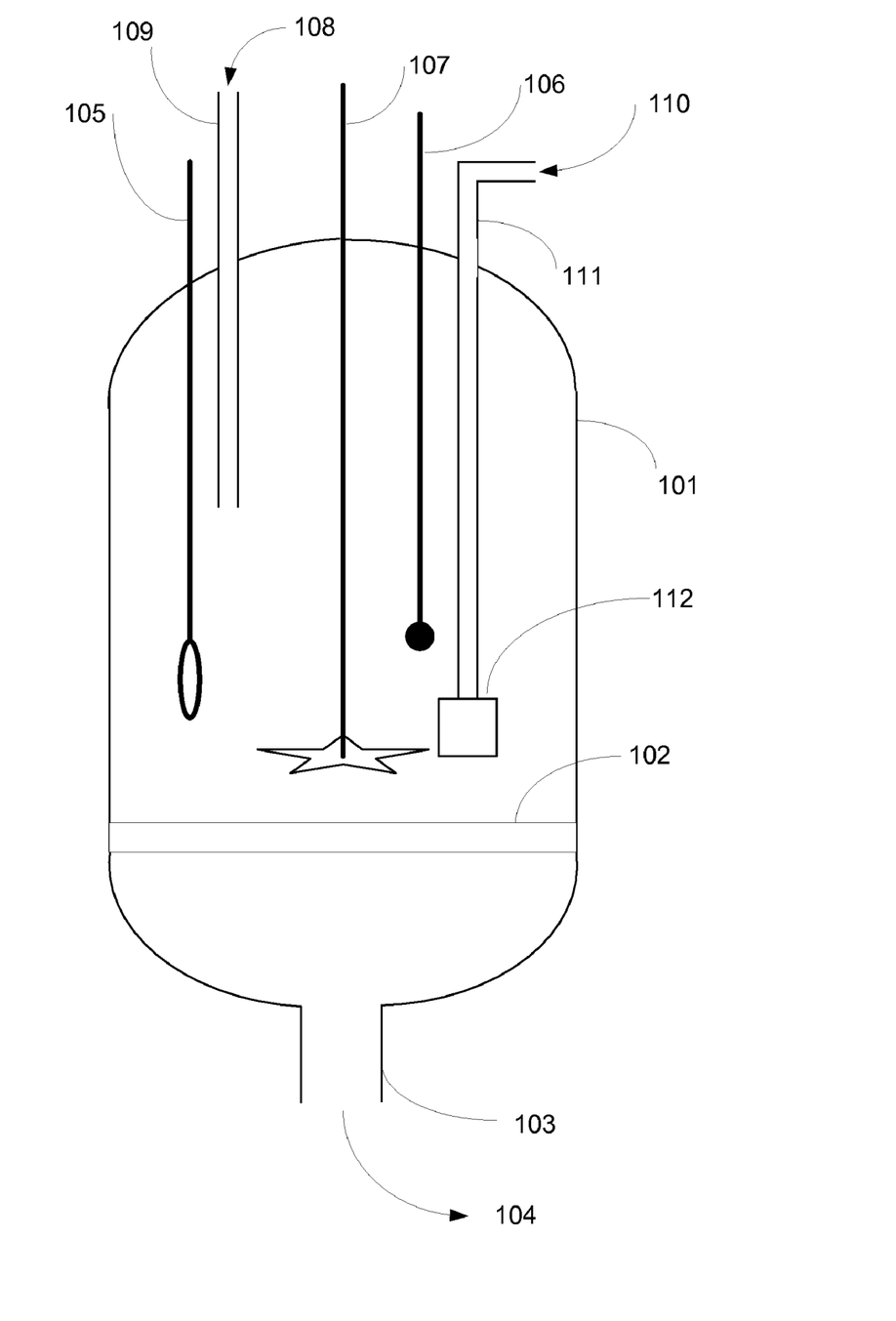
The figure illustrates a continuous flow unit in one embodiment of the present invention for purifying carbon nanotubes.

As-produced carbon nanotube material made with FeMo/MgO catalyst, made as per Example 1, was purified according to the following procedures. 20 g as-produced carbon nanotube material and 2 liters tap water were loaded in a continuous flow unit 101, shown in the FIGURE. The unit 101 is a glass reactor fitted with a medium coarse frit 102 which prevents the carbon nanotube material from going out the reactor exit 103 with the effluent stream 104. The unit is also equipped with a pH meter probe 105, a thermometer 106 and a stirrer 107. Tap water 108 was continuously flowed through the water inlet 109 into the unit 101 through the frit 102 and out the reactor exit 103 with the effluent stream 104. The flow of water to the unit was adjusted to maintain a constant liquid level in the unit. The stirrer was rotated at 1000 rpm. Before adding the carbon dioxide 110, the starting temperature was 20° C. and the starting pH was 7.3. Then carbon dioxide 110 was flowed at a rate of 4.3 liters/min to the unit through a $CO_2$ inlet tube 111 and into the aqueous nanotube mixture through a coarse frit 112 to disperse the $CO_2$ gas. Throughout the course of the treatment, the pH generally decreased and the water mixture became colored, which was attributed to the formation of soluble iron compounds. Besides fresh tap water, no other temperature control means was used. The temperature and pH are given as a function of time in Table 1, below.

TABLE 1

| Time (minutes) | Temperature (° C.) | pH | Comments |
| --- | --- | --- | --- |
| 0 | 20 | 7.3 | Water mixture was clear |
| 1 | 20 | 6.3 | |
| 5 | 22 | 6.3 | |
| 10 | 22 | 6.4 | |
| 12 | 22 | — | |
| 36 | 22 | 5.9 | |
| 60 | 22 | 5.8 | Water mixture became colored |
| 90 | 21 | 5.7 | |
| 105 | 21 | 5.5 | |
| 120 | 21 | 5.4 | Water mixture was more colored |
| 138 | 21 | 5.1 | Stopped |

After the flow of $CO_2$ was stopped at 138 minutes, the nanotube material that was retained on the coarse frit 102 was refiltered with #2 Whatman filter paper. The resulting nanotube material was dried at 110° C. for about 2 days. The weight of the dried nanotubes was 3.68 g. Thermogravimetric analysis of the sample was done up to about 950° C. and the sample had a residual ash content of 13.47 wt %.

EXAMPLE 5

This example demonstrates the purification of carbon nanotubes using a mixture of carbon dioxide, water, and SUPER IRON OUT® rust and stain remover, which contains sodium hydrosulfite ($Na_2S_2O_4$), which is a reducing agent, and sodium bisulfite ($NaHSO_3$). (Iron Out is a registered trademark of Iron Out, Inc., Fort Wayne, Ind.)

As-produced carbon nanotube material made with FeMo/MgO catalyst, made as per Example 1, was purified according to the following procedures. 500 mls deionized water was added to a round bottom flask which was equipped with an inlet tube which extended into the water and which was fitted with a coarse frit to disperse the $CO_2$ gas. The flask was also equipped with an overhead mixer, an internal thermometer, and rubber septa with a vent needle. Carbon dioxide gas was bubbled through the water at a rate of approximately 4.3 standard liters per minute while the water was cooled to 16-18° C. by immersing the flask in an ice water bath and stirred vigorously with a paddle-type mixer using an overhead motor assembly to rotate the stirring paddle. 5 g as-produced carbon nanotube material was added to the water in the flask and stirred for 30 minutes.

The nanotube material was filtered and a small sample taken. The rest of the filtered material was treated with the carbon dioxide/water mixture as before, except that 5 g of SUPER IRON OUT rust and stain remover was added to the deionized water. The filtered nanotube material was treated a total of 3 more times with the mixture of carbon dioxide, SUPER IRON OUT rust and stain remover and water. Each treatment was 30 minutes. After each treatment and filtration, the filtrate was washed 3 times with deionized water. A sample was retained after each treatment. The resulting insoluble carbon nanotube material was dried at 110° C. overnight. The resulting purified nanotube material weighed 0.64 g. Thermogravimetric analysis of each sample, which involved heating up to about 950° C., resulted in residuals of 41.65%, 9.65%, 7.14%, and 6.27% after the first, second, third and fourth treatment, respectively.

EXAMPLE 6

This example demonstrates the purification of carbon nanotubes made with a catalyst comprising cobalt and molybdenum metals on a magnesium oxide support.

As-produced carbon nanotube material made with a CoMo/MgO catalyst (3.28 wt % Co, 1.27 wt % Mo, 61.4 wt % Mg) was purified according to the following procedures. One liter deionized water was added to a round bottom flask which was equipped with an inlet tube which extended into the water and which was fitted with a coarse frit to disperse the $CO_2$ gas. The flask was also equipped with an overhead mixer, an internal thermometer, and rubber septa with a vent needle. Carbon dioxide gas was bubbled through the water at a rate of approximately 4.2 standard liters per minute while the water was cooled to 16-17° C. by immersing the flask in an ice water bath and stirred vigorously with a paddle-type mixer using an overhead motor assembly to rotate the stirring paddle. 20 g as-produced carbon nanotube material was added to the water in the flask and stirred for 30 minutes.

After the nanotubes were added to the flask, the temperature of the liquid in the flask rose to approximately 10° C. to 27° C. after 10 minutes due. The temperature held constant at about 27-28° C. for the next 20 minutes. The nanotube material was filtered using #50 Whatman filter paper. The filtered nanotube material was retreated 7 more times. In each treatment, the temperature did not rise and remained constant at about 17° C. for each 30-minute treatment. The resulting insoluble carbon nanotube material was dried at 110° C. overnight. The resulting purified nanotube material weighed 4.60 g. Thermogravimetric analysis of the sample resulted in a residual of 3.5 wt % after heating to about 950° C.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for purifying carbon nanotube material comprising, contacting a carbon nanotube material comprising carbon nanotubes, a magnesia support and a catalyst transition metal with a mixture comprising carbon dioxide and water, wherein the liquid mixture comprising carbon dioxide and water reacts with at least some of the magnesia support to form water-soluble compounds, and wherein the liquid mixture comprising carbon dioxide and water reacts with at least some of the catalyst transition metal to form water-soluble compounds.

2. The method of claim 1 further comprising separating the water-soluble compounds from the carbon nanotubes.

3. The method of claim 1 wherein the mixture further comprises a complexing agent.

4. The method of claim 1 wherein the contacting step is done more than once.

5. The method of claim 1 wherein the contacting step is done at a temperature between about 0° C. and about 40° C.

6. The method of claim 1 wherein the contacting step is done at a temperature between about 0° C. and about 30° C.

7. The method of claim 1 wherein the contacting step is done at a temperature between about 0° C. and about 20° C.

8. The method of claim 1 further comprising treating the carbon nanotube material with an acid selected from the group consisting of hydrochloric acid, nitric acid, sulfuric acid, and combinations thereof.

9. The method of claim 1 wherein the mixture further comprises a water-soluble amine.

10. The method of claim 1 wherein the mixture further comprises a chelating agent.

11. The method of claim 1 wherein mixture further comprises a reducing agent.

12. The method of claim 1 wherein the mixture further comprises sodium hydrosulfite, sodium bisulfite or both.

13. The method of claim 1 wherein the contacting is done in a continuous flow of the mixture comprising carbon dioxide and water.

14. The method of claim 1 further comprising heating the carbon nanotube material in an oxidative environment at a temperature in a range of about 100° C. and about 400° C.

15. The method of claim 1 where the contacting step is done more than once and wherein a reducing agent is added to the mixture after a first contacting.

16. The method of claim 1 where the contacting step is done more than once and after a first contacting, the mixture further comprises a reducing agent.

17. The method of claim 1 where the contacting step is done more than once and after a first contacting, the mixture further comprises a chelating agent.

18. The method of claim 1 where the contacting step is done more than once and after a first contacting, the mixture further comprises a complexing agent.

19. The method of claim 1 where the contacting step is done more than once and after a first contacting, the mixture further comprises a water-soluble amine.

20. The method of claim 1 where the contacting step is done more than once and after a first contacting, the mixture further comprises sodium hydrosulfite, sodium bisulfite or both.

* * * * *

UNITED STATES PATENT AND TRADEMARK OFFICE
CERTIFICATE OF CORRECTION

PATENT NO. : 7,488,875 B2  
APPLICATION NO. : 11/003916  
DATED : February 10, 2009  
INVENTOR(S) : Jeffrey L. Bahr et al.

Page 1 of 1

It is certified that error appears in the above-identified patent and that said Letters Patent is hereby corrected as shown below:

In column 13, claim 1, line 32, insert -- liquid -- between "a" and "mixture".

Signed and Sealed this

Thirty-first Day of March, 2009

JOHN DOLL  
*Acting Director of the United States Patent and Trademark Office*